Oct. 16, 1934.  E. STENZEL  1,977,295
VAPOR REGULATOR
Filed Oct. 5, 1932  2 Sheets-Sheet 1
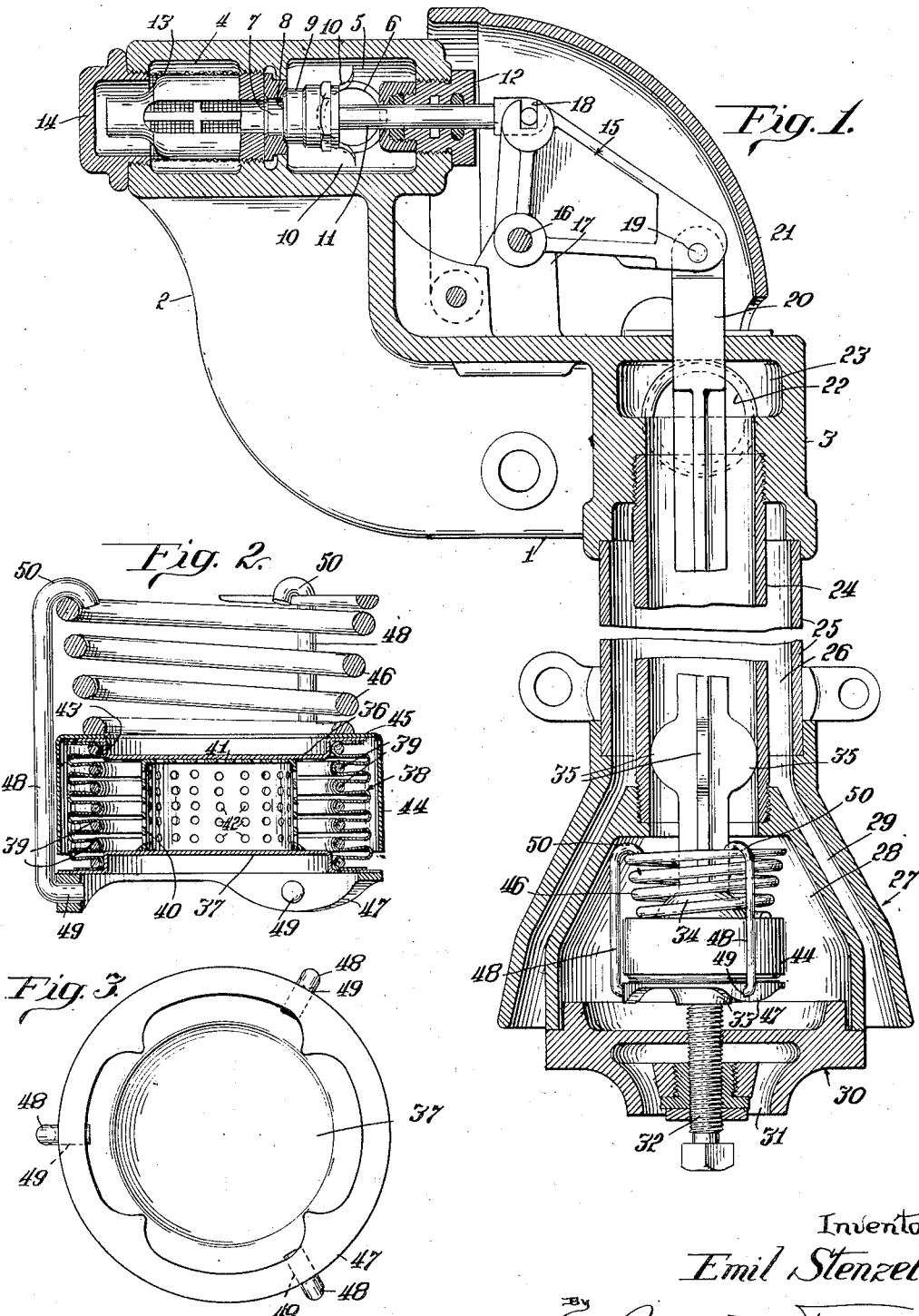
Inventor
Emil Stenzel Oct. 16, 1934.  E. STENZEL  1,977,295
VAPOR REGULATOR
Filed Oct. 5, 1932  2 Sheets-Sheet 2
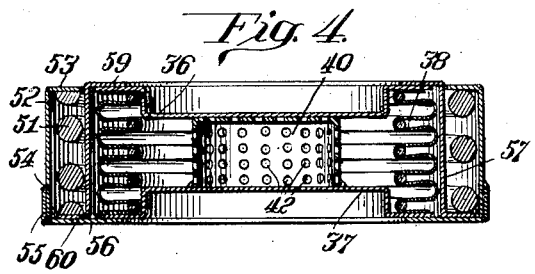
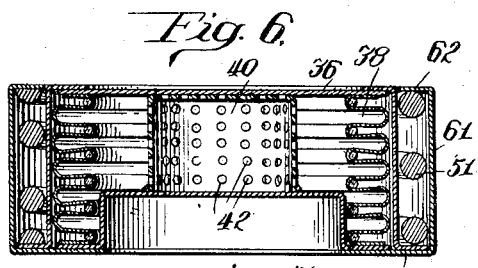
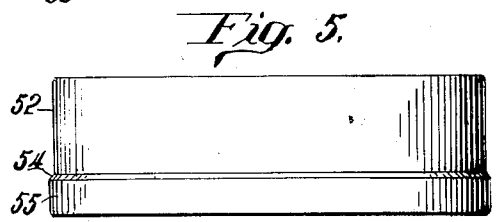
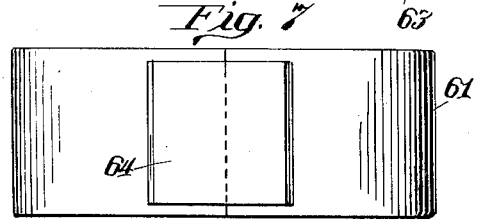
Inventor
Emil Stenzel
By Barnett & Truman
Attorneys.

Patented Oct. 16, 1934

1,977,295

UNITED STATES PATENT OFFICE 1,977,295

VAPOR REGULATOR

Emil Stenzel, Chicago, Ill., assignor to Vapor Car Heating Company, Inc., Chicago, Ill., a corporation of New York Application October 5, 1932, Serial No. 636,353

7 Claims. (Cl. 236—40)

This invention relates to certain new and useful improvements in vapor regulators for controlling the flow of vapor or steam to the radiators of a railway car heating system, and more particularly to improvements in the thermostatic operating mechanism of such a vapor regulator.

Vapor regulators of this general type, which are well known in the art, comprise a valve located in the steam supply line and a thermostatic element for controlling the valve, said thermostatic element being subject to the temperatures of the fluids returned from the radiators. The vapor regulator is usually positioned beneath the car and the thermostatic element is substantially enclosed in a housing through which the returned steam, air and some of the condensate passes before flowing out through an opening in the lower end of the housing. This housing serves to enclose the thermostatic element in a surrounding envelope of the returned fluids so that it will respond promptly to the temperature thereof.

According to the present invention, the thermostatic element comprises a closed expansible disk formed of upper and lower plates of generally circular outline connected at their edge portions by an annular expansible bellows structure so as to form a closed housing in which is confined a temperature responsive fluid which expands when heated so as to cause separation of the plates and elongation of the bellows structure. An expansible disk of this type when made of sufficient size to insure prompt and positive closing of the valve will develop excessive power so that a greater drop in temperature than desirable is necessary before the pressure on the high pressure side of the valve is sufficient to cause the valve to again open in opposition to the resistance of this partially expanded disk. According to the present improvement, this disk is loaded by a spring of the compression type which is under no material stress when the disk is fully compressed, but which must be compressed by the disk when it expands in addition to the work of closing the valve. This compressed spring serves to expedite the compression of the thermostatic disk when a comparatively slight drop occurs in the temperature of the surrounding fluid envelope, thus permitting the valve to open and close within a very small temperature range.

The principal object of this invention is to provide certain new and useful improvements in a vapor regulator, such as briefly referred to hereinabove and disclosed more in detail in the specifications which follow.

Another object is to provide an improved thermostatically operating assembly for use in a vapor regulator, said assembly comprising a spring which opposes the expanding movement of the thermostatic disk.

Another object is to provide, in a vapor regulator, a spring for resisting movement of the thermostatic member in response to an increase in temperature, so as to insure prompt opening of the valve upon a subsequent relatively small decrease in temperature.

Other objects and advantages of this invention will be more apparent from the following detained description of certain approved forms of apparatus constructed and operating according to the principles of this invention.

In the accompanying drawings:

Fig. 1 is a central vertical section through the complete vapor regulator, a preferred form of thermostatic assembly being shown in elevation therein.

Fig. 2 is an enlarged central vertical section through the form of thermostatic assembly shown in Fig. 1.

Fig. 3 is an inverted plan view of the thermostatic assembly shown in Fig. 2.

Fig. 4 is a central vertical section through a different form of the thermostatic assembly.

Fig. 5 is a side elevation of the assembly shown in Fig. 4.

Fig. 6 is a central vertical section, similar to Fig. 4, through still another form of the thermostatic mechanism.

Fig. 7 is a side elevation of the device shown in Fig. 6.

Referring first more particularly to Figs. 1, 2 and 3, the main casting or supporting frame 1 of the vapor regulator comprises an upwardly extending arm 2, in which the high and low pressure supply chambers are formed, and a horizontally projecting arm 3 from which the thermostat assembly is supported. In the arm 2 is formed a high pressure supply chamber 4 having a pipe connection (not here shown) with the source of steam supply, and a low pressure steam chamber 5 from which a conduit leads from port 6 to the heating system within the car. The steam passage 7 between the chambers 4 and 5 has a valve seat 8 at its outlet end with which cooperates a valve member 9 movable between guides 10 and carried by a valve stem 11 which projects through a packing 12 in one end of the low pressure chamber 5. A strainer 13 within the high pressure chamber 4 is held in place by closure plate 14.

A bellcrank lever 15 is pivoted at 16 on a fixed bracket 17 formed on casting 1, and has a pin and slot connection at 18 with the outer end of valve stem 11. The other arm of the bellcrank lever is pivotally connected at 19 with the upper end of an operating rod 20 which projects down into the thermostat housing, as hereinafter described. A removable guard or casing 21 serves to shield and protect the lever mechanism connecting operating rod 20 with the valve stem 11.

A return pipe from the radiators within the car is connected into an inlet port 22 leading into chamber 23 formed in the arm 3 of casting 1. An inner tube 24 and a concentric outer tube 25 extend downwardly from the arm 3. The condensate flowing in from the heating system through port 22 drains down through the annular space 26 formed between the inner and outer tubes, but the greater portion of the returned steam or hot gases flow down through the inner tube 24 around the rod 20, which latter is so formed as to offer as little resistance as possible to the flow of fluids through the tube 24.

The lower ends of the tubes 24 and 25 are connected with a lower bell-shaped casting 27. The inner tube 24 leads down into a thermostat-housing chamber 28 which is entirely closed, except for the open lower end and for the connection at the upper end with tube 24. The annular space 26 between the tubes 24 and 25 connects with drain passages 29 formed outside of the thermostat chamber 28. A removable closure member indicated as an entirety at 30, is removably secured to the lower end of the housing 27 so as to substantially close the thermostat chamber 28 except for a restricted outlet passage for the fluids returned to said chamber from the heating system, said outlet being indicated generally at 31. A supporting post in the form of an adjustable screw 32 is mounted centrally in the closure member 30, and carries a head 33 at its upper end upon which the thermostatic member, hereinafter described, is supported. A head 34 formed at the lower end of operating rod 20 rests upon the upper side of the thermostatic member, and a plurality of rounded projections 35 on the sides of rod 20 serve to loosely guide this rod for its vertical movements through the inner tube 24.

The improved thermostatic assembly comprises an expansible disk formed of upper and lower generally circular plates 36 and 37 the outer edge portions of which are connected by an annular corrugated metallic bellows structure 38. This bellows is secured at its upper edge to the outer edge portion of upper plate 36 by soldering, or in some other suitable manner, and is similarly connected at its lower edge to the outer edge portion of the bottom plate 37. Wire rings 39 or other annular filler members may be inserted in the looped edge portions of the metallic bellows structure between the successive overlapping corrugations thereof so as to space these members apart and avoid breakage by an undue flattening of the corrugations. The closed disk thus formed confines a quantity of a suitable heat-responsive fluid which expands or contracts in accordance with the temperatures to which the thermostatic disk is subjected. In order to limit the compressing movement of the disk when the fluid contracts at normal temperatures so as to tend to form a partial vacuum within the disk, a cup-shaped member 40 is mounted within the disk on the upper surface of bottom plate 37 so that the top 41 of this member will engage the lower surface of the upper plate 36. This cup-shaped limiting member is perforated as indicated at 42 so as to permit free passage of the heat responsive fluid thereto and thereby not limit the effective capacity of the disk. The elongation of the disk when the heat responsive fluid is subjected to steam temperatures is limited (in the form of the device shown in Figs. 1, 2 and 3) by the loading spring hereinafter described. The upper and lower plates 36 and 37, or either of them, may be dished inwardly as indicated at 43 so as to decrease the effective thickness of the disk between the supporting members 33 and 34 while permitting the use of a longer flexible bellows structure 38.

A downwardly projecting sleeve 44 having at its upper edge an inturned annular flange 45 resting upon the upper plate 36 serves to protect the flexible bellows. This protecting member may be secured directly to the top plate 36 of the disk, or it may be merely clamped against the disk by the loading spring 46. The rather strong compression spring 46 rests at its lower end upon the top of the expansible disk, or upon the inturned flange 45 of protecting member 44. A suitable cage structure for connecting the top of spring 46 with the bottom plate 37 of the disk comprises, in the form here shown, an annular frame member 47 resting against the bottom of plate 37 and a plurality of links 48 pivoted at their lower ends 49 in frame 47 and having hooked upper ends 50 which are engaged over the uppermost coil of spring 46. When assembled as shown in Figs. 1, 2 and 3, with the thermostatic disk completely compressed, the spring 46 is under only slight compression just sufficient to hold the parts in assembled relation. However, when the expansible disk is heated and tends to elongate, this movement will be resisted by spring 46 so as to load the disk. The thermostatic assembly as just described, which is shown detached in Figs. 2 and 3, is supported within thermostatic chamber 28 of the vapor regulator by positioning the lower and upper plates 37 and 36 of the thermostatic disk between the heads 33 and 34 at the upper end of screw 32 and lower end of rod 20 respectively.

Referring now to the general operation of the improved vapor regulator, when the system is cold and there is little or no steam in the thermostat chamber 28, the thermostatic member or disk will be contracted as shown in Fig. 1. At this time the valve 9 will be in open position so that steam can flow freely from the source of supply through the inlet chamber 4 and passage 7 into the outlet chamber 5 and thence to and through the radiators. When the radiating system has become filled with steam, excess steam will flow back through port 22 and downwardly through the inner pipe 24 so as to fill the thermostat chamber 28. This surrounding envelope of steam will heat the thermostatic disk, causing the fluid therein to expand, thus causing the plates 36 and 37 to separate. Since the bottom plate 37 is held against actual downward movement by the supporting head 33 on post 32, the upper plate 36 will be forced to move upwardly thereby lifting the operating rod 20 and through the bellcrank lever 15 and valve stem 11 moving valve 9 to closed position thus cutting off the further flow of steam to the radiators. As the steam condenses, the gases in chamber 28 will become lower in temperature and the thermostatic element will again contract permitting the plates 36 and 37 to move closer together thus lowering the operating rod 20 and permitting the valve 9 to open. Additional steam will then flow into the radiators. This process will be repeated at intervals so as to keep the radiating system full of steam. It will be apparent that when the thermostatic disk expands to close the valve, it must also place spring 46 under compression. The force of this compressed spring will thus be constantly exerted to aid the high pressure steam in chamber 4 in compressing the diaphragm and opening the valve when the temperature within thermostat chamber 28 is slightly lowered so as to cause a decrease in the temperature to which the thermostatic disk is subjected.

Experience has shown in that a thermostatic disk of the bellows type herein disclosed when made large enough to insure prompt and positive closing of the valve at steam temperatures, and also when made of such size that the bellows structure will have adequate strength and will not be unduly flexed at any temperature within the range to which it is subjected, an excessive expanding force is developed by the confined fluid when subjected to the higher temperatures, which force is not resisted to any material extent by the metallic structure of the enclosing disk casing. It is desirable that the disk be again compressed promptly upon a very small decrease in the temperature to which the disk is subjected, and the normal steam pressure exerted on valve 9 will be insufficient to cause this prompt compression of the disk unless an added load is imposed upon the disk. For this purpose the spring 46 is provided. The resulting assembly will respond promptly to a very slight change in temperature in either direction, and at the same time has adequate strength and power to be long-lived and insure prompt opening and closing of the valve.

Two other modified forms of this thermostatic assembly are shown in Figs. 4 to 7 inclusive. In each of these forms the thermostatic disk itself is of substantially the form heretofore described and the parts thereof are indicated by the same reference characters. Referring first to the form shown in Figs. 4 and 5, the compression spring 51 is of such size that its coils will loosely surround the thermostatic bellows, and its over-all height when under slight compression is substantially the same as that of the compressed thermostatic disk. A sleeve 52 which encloses spring 51 has at its upper end an inturned annular flange 53 which engages over the upper coil of spring 51. The lower portion of sleeve 52 is secured, for example by soldering at 54, to the upturned flange 55 of an angular annular member, the lower horizontal flange 56 of which engages beneath the bottom plate 37 of the theremostatic disk. A second sleeve 57 is interposed between the spring 51 and the thermostatic bellows 38. This sleeve has an upper inturned annular flange 59 which engages over the outer portion of top plate 36 of the thermostatic disk, and, also has an outturned lower annular flange 60 which engages beneath the bottom coil of spring 51. It will be apparent that as the thermostatic disk is expanded and the top plate 36 thereof is moved upwardly, the intermediate sleeve 57 will be pulled upwardly so as to compress the spring 51. This assembly is quite compact and the loading spring 51 is completely enclosed within the housing formed by the outer sleeve members 52 and 55.

The assembly shown in Figs. 6 and 7 is much the same when completed and assembled as the form shown in Figs. 4 and 5. In Figs. 6 and 7 the outer casing member is formed of two similar semi-cylindrical portions 61 each having an upper inturned flange 62 engaging over the upper coil of spring 51, and a lower inturned flange 63 engaging beneath the bottom plate 37. The two halves 61 are secured together when positioned about the assembled parts, by means of plates 64 soldered over the meeting end portions thereof, or in any other suitable manner.

It will be noted that in all forms of the device, means are provided for limiting both the expanding and contracting movements of the thermostatic member so as to protect the bellows diaphragm from injury due to excessive prolongation or compression, and in all forms the bellows is susbtantially enclosed so as to protect it from injury when inserting the assembly into or removing it from the thermostatic chamber, this protecting member also acting as a drip shield to keep the greater portion of the condensate from direct contact with the bellows.

I claim:

1. A thermostatic operating unit for a vapor regulator, said unit comprising a closed expansible thermostatic disk formed of upper and lower plates, an annular corrugated bellows structure secured to the edge portions of the respective plates, and an expansible temperature responsive fluid confined within the disk, a compression spring having a normal height when under no material compression substantially the same as that of the compressed disk, the spring being positioned about the disk, a sleeve structure enclosing the spring and connected at its upper and lower ends to the upper end of the spring and the lower plate respectively, and a second sleeve structure positioned between the spring and bellows and having inwardly and outwardly projecting flanges at its upper and lower ends respectively, the upper flange engaging the upper plate of the disk, and the lower flange engaging the lower end portion of the spring.

2. A thermostatic operating unit for a vapor regulator, said unit comprising a closed expansible thermostatic disk formed of upper and lower plates, an annular corrugated bellows structure secured to the edge portions of the respective plates, and an expansible temperature responsive fluid confined within the disk, a compression spring supported at its lower end upon the upper plate of the disk, a frame member positioned in engagement with the lower plate of the disk, and a plurality of links pivotally mounted in the frame member and having hooked upper ends engaging over the upper coil of the spring.

3. A thermostatic operating unit for a vapor regulator, said unit comprising a closed expansible thermostatic disk formed of upper and lower plates, an annular corrugated bellows structure secured to the edge portions of the respective plates, and an expansible temperature responsive fluid confined within the disk, means mounted on one plate within the disk and adapted to engage the other plate to limit compressing movement of the disk, a compression spring supported at its lower end upon the upper plate of the disk, a frame member positioned in engagement with the lower plate of the disk, and a plurality of links pivotally mounted in the frame member and having hooked upper ends engaging over the upper coil of the spring.

4. A thermostatic operating device for a vapor regulator, said device consisting of a unitary assembly of parts adapted to be bodily positioned in or removed from the vapor regulator and comprising a closed expansion thermostatic disk formed of upper and lower plates, an annular corrugated bellows structure secured to the edge portions of the plates, and an expansible temperature responsive fluid confined within the disk, a compression spring, and means securing the spring to the disk exteriorly thereof with the lower end of the spring in fixed relation to the upper plate of the disk, a non-extensible portion of said means connecting the upper end of the spring with the lower plate of the disk so that the spring will be compressed as the disk is expanded.

5. A thermostatic operating device for a vapor regulator, said device consisting of a unitary assembly of parts adapted to be bodily positioned in or removed from the vapor regulator and comprising a closed expansible thermostatic disk formed of upper and lower plates, an annular corrugated bellows structure secured to the edge portions of the plates, and an expansible temperature responsive fluid confined within the disk, a compression spring, and means securing the spring to the disk exteriorly thereof with the lower end of the spring in fixed relation to the upper plate of the disk, a non-extensible portion of said means partially enclosing the spring and disk and connecting the upper end of the spring with the lower plate of the disk so that the spring will be compressed as the disk is expanded.

6. A thermostatic operating device for a vapor regulator, said device consisting of a unitary assembly of parts adapted to be bodily positioned in or removed from the vapor regulator and comprising a closed expansible thermostatic disk formed of upper and lower plates, an annular corrugated bellows structure secured to the edge portions of the plates, and an expansible temperature responsive fluid confined within the disk, a compression spring supported at its lower end upon the upper plate of the disk, and a non-extensible cage structure positioned about the spring and disk and connecting the upper end portion of the spring with the lower plate of the disk.

7. A thermostatic operating device for a vapor regulator, said device consisting of a unitary assembly of parts adapted to be bodily positioned in or removed from the vapor regulator and comprising a closed expansible thermostatic disk formed of upper and lower plates, an annular corrugated bellows structure secured to the edge portions of the plates, and an expansible temperature responsive fluid confined within the disk, a protecting sleeve extending downwardly about the bellows and having an inwardly projecting flange resting upon the upper plate of the disk, a compression spring resting at its lower end upon the flange of the sleeve and holding same in engagement with the disk, and a non-extensible cage structure positioned about the spring and disk and connecting the upper end portion of the spring with the lower plate of the disk.

EMIL STENZEL.